Jan. 11, 1938.　　　　　J. L. JONES　　　　　2,104,749
WELDING APPARATUS
Filed Nov. 2, 1935
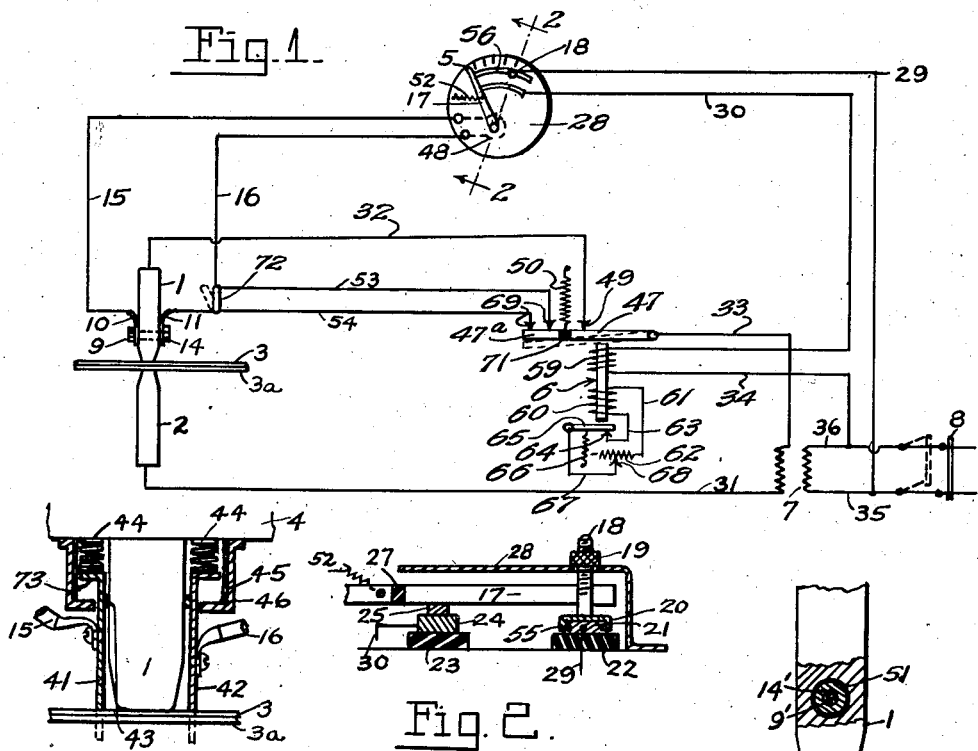
James L. Jones
INVENTOR Patented Jan. 11, 1938

2,104,749

UNITED STATES PATENT OFFICE 2,104,749

WELDING APPARATUS

James L. Jones, Washington, D. C.

Application November 2, 1935, Serial No. 48,061

2 Claims. (Cl. 219—4)

(Granted under the Act of March 3, 1883, as amended April 30, 1928; 370 O. G. 757)

This invention relates to welding apparatus, and it has particular relation to apparatus for spot welding a plurality of sheets or plates.

One of the objects of the present invention is the provision of a welding apparatus by means of which metal plates may be properly welded together regardless of whether they are of varying thickness or whether their surfaces are clean or oxidized.

Another object of the invention is to provide a welding apparatus having means for automatically timing the welding operation in accordance with the temperature of the metal, thus eliminating the possibility of burning the metal by subjecting the same to excess heating, or from obtaining insufficient fusion by under-heating the metal, as is frequently the case when the time of weld is determined solely by the operator.

Still another object of the invention is the provision of a welding apparatus which not only includes means for automatically controlling the length of time the welding current is applied to bring the metal up to the proper welding temperature, but also the time that the current is applied thereafter in order to secure the proper molecular union between the parts.

A further object of the invention is the provision of a welding apparatus embodying the thermocouple controlled by the temperature of the electrodes for adjustably controlling the time the welding current is applied, in order to bring the work up to the proper temperature for welding and also an adjustable, slow acting relay controlled by said thermocouple for also controlling the time the current is applied after the proper temperature has been reached.

With these and other objects in view, as well as other advantages which may be incident to the use of the improvements, the invention consists of the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawing means for carrying the invention into practical effect, without limiting the improvements in their useful application to the particular construction, which, for purposes of explanation, have been made the subject of illustration.

In the accompanying drawing:

Fig. 1 is a diagrammatic view of a welding apparatus constructed in accordance with the invention;

Fig. 2 is a fragmentary, transverse, sectional view through the galvanometer taken on line 2—2 of Fig. 1;

Fig. 3 is a perspective view of a welding machine embodying the invention;

Fig. 4 is a longitudinal, sectional view through a welding electrode and associated thermocouple;

Fig. 5 is a view, partly in elevation and partly in longitudinal section, of another form of electrode and thermocouple;

Fig. 6 is a view partly in elevation and partly in section taken on line 6—6 of Fig. 5;

Fig. 7 is an elevational view of another attachment between the electrode and the dissimilar metallic elements of the thermocouple;

Fig. 8 is a similar view of still another form of attachment between the electrode and the elements of the thermocouple; and Fig. 9 is a vertical, sectional view of another form of thermocouple in which the elements thereof are heated by the conduction of heat from the work.

Referring to the drawing, a welding apparatus constructed in accordance with the present invention is shown as comprising a pair of welding electrodes 1 and 2 carried by arms 4 and 4a of a welding machine 40, for movement into and out of welding position with respect to plates 3 and 3a, which are to be spot welded together. Welding current is supplied to the electrodes 1 and 2 from a transformer 7, the primary winding of which is connected with a suitable source of electric energy through wires 35 and 36 and a switch 8, and the secondary winding of which is connected with the electrodes 1 and 2 through wires 31 and 32, contact 49, armature 47 of an adjustable, slow acting relay 6 of the usual commercial type, and wire 33 back to the secondary winding of the transformer. The armature 47 is normally maintained in engagement with the contact 49 by means of a coil spring 50, but is moved out of engagement therewith in order to interrupt the welding circuit by the relay 6 in a manner presently to be described.

The current through the electrodes 1 and 2 is controlled by a thermocouple comprising members 10 and 11 of dissimilar metals, which are secured to the electrode 1 by screws 9 and 14 and which are connected to the terminals of the coil 48 of a galvanometer 5 by means of wires 15 and 16. The galvanometer 5 includes in its construction a needle or movable contact member 17, which is yieldably held at a zero position by a spring 52, and which is provided with a contact piece 25 for sliding contact with an arcuate contact bar 24. The outer end of the needle is insulated from the inner or pivoted end thereof, as at 27, and the contact 24 is also insulated from its mounting, as at 23. The galvanometer 5 also includes an adjustable contact 18, fixed to a member 20 provided with inwardly extending edges 55 for sliding engagement with grooves in a fixed arcuate contact member 21 insulated from the adjacent parts, as at 22. The contact 18 extends through an arcuate slot 56 in the graduated dial portion 28 of the galvanometer, and is held in adjusted position by means of a lock nut 19 threaded thereon. (Fig. 2). The adjustable contact 18 is connected by means of a wire 29 with the wire 35 between the switch 8 and transformer 7, but the fixed contact 24 is connected by a wire 30 with one terminal of the main winding 59 of the relay 6, the other terminal of which is connected by a wire 34 to the wire 36.

As previously stated, the relay 6 is of the slow acting type, in that it is slow to pick up but quick to release. This action is effected through a short circuit winding 60, one terminal of which is connected by a wire 61 with a resistance element 62. The other terminal of the winding 60 is connected by a wire 63 to a contact 64, which is normally engaged by a second armature 65 under the action of a relatively light spring 66, and which is in turn connected by a wire 67 with a contact 68, mounted for adjustable engagement with the resistance element 62.

In operation, the switch 8 is first closed so as to complete the circuit through the primary winding of the transformer 7. The work is then placed between the electrodes 1 and 2 and the latter closed thereon, which completes the circuit from one terminal of the secondary winding of the transformer 7, wire 33, armature 47 of relay 6, contact 49, wire 23, electrode 1, work 3—3a, electrode 2 and wire 31 back to the other terminal of the secondary winding. The current traversing the circuit just traced raised the temperature of the metal to the degree required for welding, and also heats the elements 10 and 11 of the thermocouple. This causes an electric current to flow in the wires 15, 16, and coil 48 of the galvanometer 5 in the usual manner, and swings the needle 17 about its pivot in a clockwise direction. When the temperature of the metal reaches the desired degree, the movable contact 17 engages the contact 18, which is adjusted to such temperature and establishes a circuit from the line wire 35 through wire 29, adjustable contact 18, movable contacts 17 and 25, fixed contact 24, wire 30, main winding 59 of relay 6 and wire 34 to the line wire 36. The current traversing this circuit energizes the winding 59, but by reason of the fact that the auxiliary winding 60 is short circuited, it is slow to attract the armature 47. However, after a given interval of time, which is determined by the adjustment of the contact 68 with respect to the resistance element 62, sufficient magnetism builds up to attract the armature 47 and open the circuit of the auxiliary winding 60, thereby destroying the neutralizing effect of this winding. This permits the relay 6 to immediately become fully energized and attract the armature 47 against the action of the spring 50, so as to open the contact 49 and the welding circuit controlled thereby.

It will be apparent from the foregoing that the galvanometer 5 controls the time that the current flows in the welding circuit in bringing the temperature of the work up to that required for a proper fusion of the parts, and that the slow acting relay 6 controls the time that the current flows during the actual welding or molecular union occurs, both of said instrumentalities being adjustable in accordance with the particular metal being united and the thickness and surface characteristics thereof.

If desired, the wires 11 and 16 may be connected by wires 54 and 53 with contacts 69, respectively, for engagement by an extension 47a of the armature 47, which is insulated therefrom, as at 71. In this case a switch 72 is inserted in the circuit so as to render this circuit independent from the thermocouple circuit previously described.

Fig. 5 illustrates a construction in which the elements 10 and 11 of the thermocouple are secured to the electrode 1 by means of a screw 9' which engages within the interiorly screw threaded shank 26 of a bolt 14'. In this case the shank 26 and the elements 15 and 16 are insulated from the electrode 1 by a sleeve 51 and washers 12 and 13, respectively of insulating material.

Fig. 8 illustrates a construction in which the elements 10 and 11 are adjustably secured to the electrode 1 by means of a strap 57 and a screw bolt 58. In this case the elements 10 and 11 may be shifted upwardly along the electrode as the latter burns away, by merely loosening the screw bolt 58.

Fig. 9 illustrates a construction in which the wires 15 and 16 are secured to two semi-cylindrical elements 41 and 42 of dissimilar metals and each provided with a horizontally extending flange 73 at its upper edge. These parts surround the electrode 1, being insulated therefrom as at 43, and are yieldably held in contact with the work heated thereby by coil springs 44 interposed between the flanges 73 and the electrode holder 4. The upper portions of the elements 41 and 42 and the springs 44 are enclosed within a housing 46 and are insulated therefrom by a sleeve 45 of insulating material.

Fig. 4 illustrates a still further modification of the invention in which electrode 1 is provided with a longitudinal bore 74, through which elements 37 and 38 of dissimilar metals extend and are insulated from the main body of the electrode by spaced sleeves 39 of insulating material.

From the foregoing it will be apparent that a very efficient spot welding apparatus is provided, by means of which a very satisfactory welded connection is obtained without danger of under-heating or over-heating the work, and in which the time required for a proper weld is determined automatically in accordance with the type of metal and the thickness of the sheets or plates, as well as the surface characteristics thereof.

Other modifications and changes in the proportions and arrangement of the parts may be made by those skilled in the art without departing from the nature and scope of the invention, as defined in the appended claims.

The invention described herein may be manufactured and used by or for the Government of the United States of America for governmental purposes without the payment of any royalties thereon or therefor.

What is claimed is:

1. Apparatus for welding comprising a pair of electrodes; a circuit for supplying electric energy to said electrodes; and delayed action means controlled by the temperature of said electrodes for interrupting said circuit a predetermined time interval after welding temperature is reached.

2. Apparatus for welding comprising a pair of electrodes; a circuit for supplying electric energy to said electrodes; a slow acting relay for controlling said circuit; a contact device for controlling said relay; and a thermocouple responsive to the temperature of said electrodes for closing said contact device to energize said relay when welding temperature is reached, the delayed action of said relay interrupting said circuit at a predetermined interval of time after the closing of said contact device when the welding operation is completed.

JAMES L. JONES.